(12) United States Patent
Van Der Horst

(10) Patent No.: US 8,537,293 B2
(45) Date of Patent: Sep. 17, 2013

(54) AUTOSTEREOSCOPIC DISPLAY DEVICE

(75) Inventor: Jan Van Der Horst, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2 days.

(21) Appl. No.: 13/322,227

(22) PCT Filed: May 21, 2010

(86) PCT No.: PCT/IB2010/052285
§ 371 (c)(1),
(2), (4) Date: Mar. 13, 2012

(87) PCT Pub. No.: WO2010/136951
PCT Pub. Date: Dec. 2, 2010

(65) Prior Publication Data
US 2012/0154697 A1   Jun. 21, 2012

(30) Foreign Application Priority Data
May 28, 2009   (EP) ..................................... 09161377

(51) Int. Cl.
*G02F 1/1335*   (2006.01)
(52) U.S. Cl.
USPC ........................................... 349/15; 349/168
(58) Field of Classification Search
USPC ..................................... 349/8, 168
See application file for complete search history.

(56) References Cited

U.S. PATENT DOCUMENTS

| | | | |
|---|---|---|---|
| 4,767,194 A | 8/1988 | Heppke |
| 6,069,650 A | 5/2000 | Battersby |
| 6,989,190 B2 | 1/2006 | Gaggar |
| 7,058,252 B2 | 6/2006 | Woodgate |
| 2007/0109400 A1 | 5/2007 | Woodgate |
| 2007/0296896 A1 | 12/2007 | Hong |
| 2008/0100764 A1 | 5/2008 | Haruyama |
| 2008/0129901 A1 | 6/2008 | You |
| 2008/0266388 A1 | 10/2008 | Woodgate |

FOREIGN PATENT DOCUMENTS

| | | |
|---|---|---|
| EP | 1688783 A1 | 8/2006 |
| GB | 2398130 A1 | 8/2004 |
| WO | 03015424 A2 | 2/2003 |
| WO | 2005075603 A1 | 8/2005 |
| WO | 2007007285 A2 | 1/2007 |
| WO | 2007147516 A1 | 12/2007 |
| WO | 2008023285 A1 | 2/2008 |
| WO | 2008126049 A1 | 10/2008 |

OTHER PUBLICATIONS

Blue Phase Mode LCD, Aug. 20, 2010.

*Primary Examiner* — Phu Vu

(57) ABSTRACT

A switchable autostereoscopic display device comprises a display panel (60) and an imaging arrangement (620 for directing the output from different pixels to different spatial positions to enable a stereoscopic image to be viewed. The imaging arrangement comprises a blue phase LC material. A controller switches the blue phase material to an isotropic state for the 2D mode and to a birefringent state for the 3D mode. This arrangement enables a switchable lens arrangement to be formed without alignment layers. This can give a high angle performance thin switchable arrangement.

10 Claims, 3 Drawing Sheets

AUTOSTEREOSCOPIC DISPLAY DEVICE

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A known device uses a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

One way to implement this is to provide an electrically switchable lenticular array. In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device are formed of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer. A more detailed description of the structure and operation of the switchable device can be found in U.S. Pat. No. 6,069,650.

There are two different approaches for controlling the switchable LC material. A first approach as outlined above uses a switchable material as the lens element and a non-switchable material as a replica. A second approach uses two cells in series, a first, passive, cell with a birefringent lens replica and a second polarization switching cell. In one mode, the second cell rotates the polarization of the incoming light, and in the other mode it doesn't. This system is described in more detail in U.S. Pat. No. 7,058,252.

Both of these approaches give rise to reduced angle performance in at least one of the two modes. Furthermore, the multiple cell approach requires a non-standard birefringent replica material, and is relatively thick as a result of the need for series cells. Thin lens systems for mobile device applications are then difficult to achieve. These approaches also require alignment between the LC modes and the polarization direction of the display.

There is therefore a need for an improved switchable 2D/3D display system. In particular, there is a need for the 2D performance to be impacted as little as possible by the switchable arrangement, and for the switching speed to be as high as possible.

SUMMARY OF THE INVENTION

It is an object of the invention to fulfill the aforementioned goal. The invention is defined by the independent claims. The dependent claims define advantageous embodiments.

According to a first aspect of the invention, there is provided a switchable autostereoscopic display device having 2D and 3D modes of operation, comprising:

a display panel having an array of display pixels for producing a display, the display pixels being arranged in rows and columns; and a lens arrangement comprising a lens element arrangement and a replica structure, one of which is formed of a blue phase LC material and the other of which is formed of a non-switchable isotropic material, the lens arrangement being for directing the output from different pixels to different spatial positions to enable an autostereoscopic image to be viewed, wherein the device further comprises a controller adapted to switch the blue phase material to an isotropic state for the 2D mode and to a birefringent state for the 3D mode, and wherein in the 2D mode, the refractive index of the blue phase material matches the refractive index of the non-switchable isotropic material.

This provides a simplified structure for the switchable imaging arrangement.

The arrangement enables a switchable lens arrangement to be formed without alignment layers, and simply using a lens arrangement, a replica arrangement and switching electrodes, with the lens or replica arrangement formed of blue phase LC material. This can give a high angle performance thin switchable arrangement.

Because the isotropic state is used for the 2D mode, this improves the 2D mode substantially, compared to the electric-field aligned mode used in existing switchable lens arrangements. Thus, the 2D performance is enhanced by the particular arrangement of the invention, as the residual diffraction in the 2D mode is reduced to a minimum, by using an isotropic mode of the blue phase material. The blue phase material also gives high switching speed.

The isotropic mode is angle and polarization independent.

According to a second aspect of the invention, there is provided a switchable autostereoscopic display device having 2D and 3D modes of operation, comprising:

a display panel having an array of display pixels for producing a display, the display pixels being arranged in rows and columns; and an imaging arrangement for directing the output from different pixels to different spatial positions to enable an autostereoscopic image to be viewed, wherein the imaging arrangement comprises a blue phase LC material, and wherein the device further comprises a controller adapted to switch the blue phase material to an isotropic state for one of the 2D and 3D modes and to a birefringent state for the other of the 2D and 3D modes, wherein the imaging arrangement comprises a lens arrangement (62) and a switchable polarization modifying device, wherein the switchable polarization modifying device comprises the blue phase LC material.

In this example, the imaging arrangement comprises a lens arrangement and a switchable polarization modifying device, wherein the switchable polarization modifying device comprises the blue phase LC material.

The first aspect of the invention also provides a method of providing an autostereoscopic display switchable between 2D and 3D modes of operation, comprising:

producing a display from a display panel having an array of display pixels, the display pixels being arranged in rows and columns; and directing the output from different pixels to different spatial positions to enable an autostereoscopic image to be viewed, using a lens arrangement which comprises a lens element arrangement (72) and a replica structure (70), one of which is formed of a blue phase LC material and the other of which is formed of a non-switchable isotropic material; and switching the blue phase material to an isotropic state for the 2D mode and to a birefringent state for the 3D mode, and wherein in the 2D mode, the refractive index of the blue phase material matches the refractive index of the non-switchable isotropic material.

The second aspect of the invention also provides a method of providing an autostereoscopic display switchable between 2D and 3D modes of operation, comprising:

producing a display from a display panel having an array of display pixels (5), the display pixels being arranged in rows and columns; and directing the output from different pixels to different spatial positions to enable an autostereoscopic image to be viewed, using an the imaging arrangement which comprises a lens arrangement and a switchable polarization modifying device, wherein the switchable polarization modifying device comprises a blue phase LC material; and switching the blue phase material to an isotropic state for one of the 2D and 3D modes and to a birefringent state for the other of the 2D and 3D modes.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides a switchable autostereoscopic display device in which a lens arrangement directs the output from different pixels to different spatial positions to enable a stereoscopic image to be viewed. The lens arrangement is electrically switchable between a 2D mode and a 3D mode, and uses a blue phase liquid crystal material.

Before describing the invention in detail, an example of known switchable arrangement will first be described.

Figure 1:
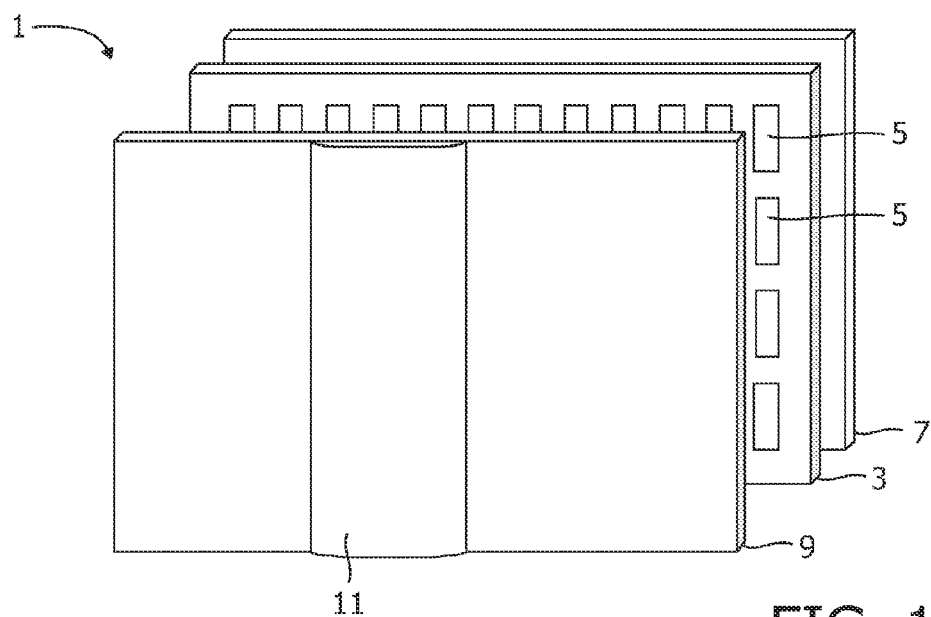
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

It has been proposed to provide electrically switchable lens elements, as mentioned above. This enables the display to be switched between 2D and 3D modes.

Figure 2:
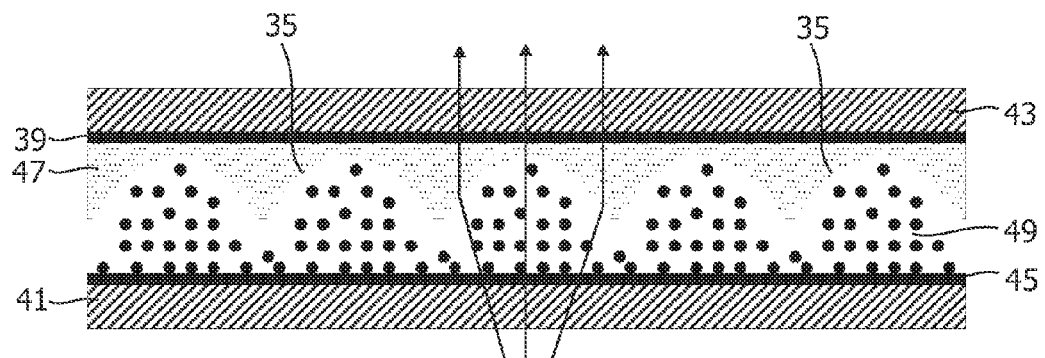
FIGS. 2 and 3 are used to explain the operating principle of the lens array of the display device shown in FIG. 1.
Figure 3:
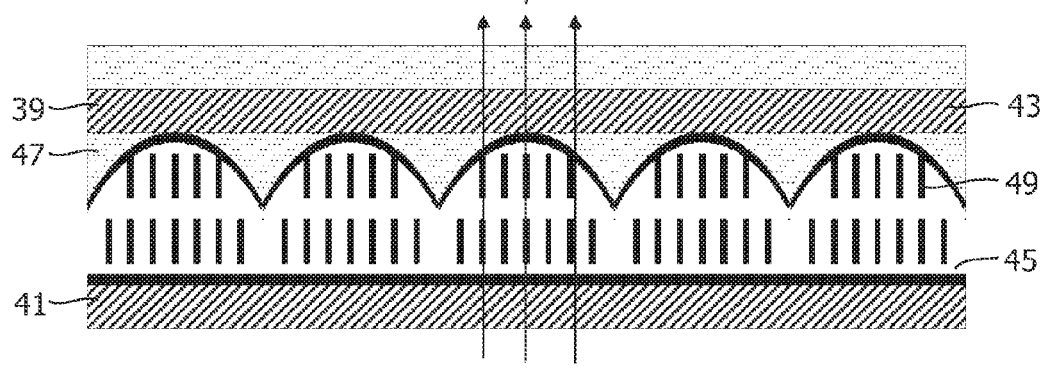

FIGS. 2 and 3 schematically show an array of electrically switchable lenticular elements 35, which can be employed in the device shown in FIG. 1. The array comprises a pair of transparent glass substrates 39, 41, with transparent electrodes 43, 45 formed of indium tin oxide (ITO) provided on their facing surfaces. An inverse lens structure 47, formed using a replication technique, is provided between the substrates 39, 41, adjacent to an upper one of the substrates 39. Liquid crystal material 49 is also provided between the substrates 39, 41, adjacent to the lower one of the substrates 41.

The inverse lens structure 47 causes the liquid crystal material 49 to assume parallel, elongate lenticular shapes, between the inverse lens structure 47 and the lower substrate 41, as shown in cross-section in FIGS. 2 and 3. Surfaces of the inverse lens structure 47 and the lower substrate 41 that are in contact with the liquid crystal material are also provided with an orientation layer (not shown) for orientating the liquid crystal material.

FIG. 2 shows the array when no electric potential is applied to the electrodes 43, 45. In this state, the refractive index of the liquid crystal material 49 is substantially higher than that of the inverse lens array 47, and the lenticular shapes therefore provide a light output directing function, as illustrated.

FIG. 3 shows the array when an alternating electric potential of approximately 50 to 100 volts is applied to the electrodes 43, 45. In this state, the refractive index of the liquid crystal material 49 is substantially the same as that of the inverse lens array 47, so that the light output directing function of the lenticular shapes is cancelled, as illustrated. Thus, in this state, the array effectively acts in a "pass through" mode.

Further details of the structure and operation of arrays of switchable lenticular elements suitable for use in the display device shown in FIG. 1 can be found in U.S. Pat. No. 6,069,650.

Figure 4:
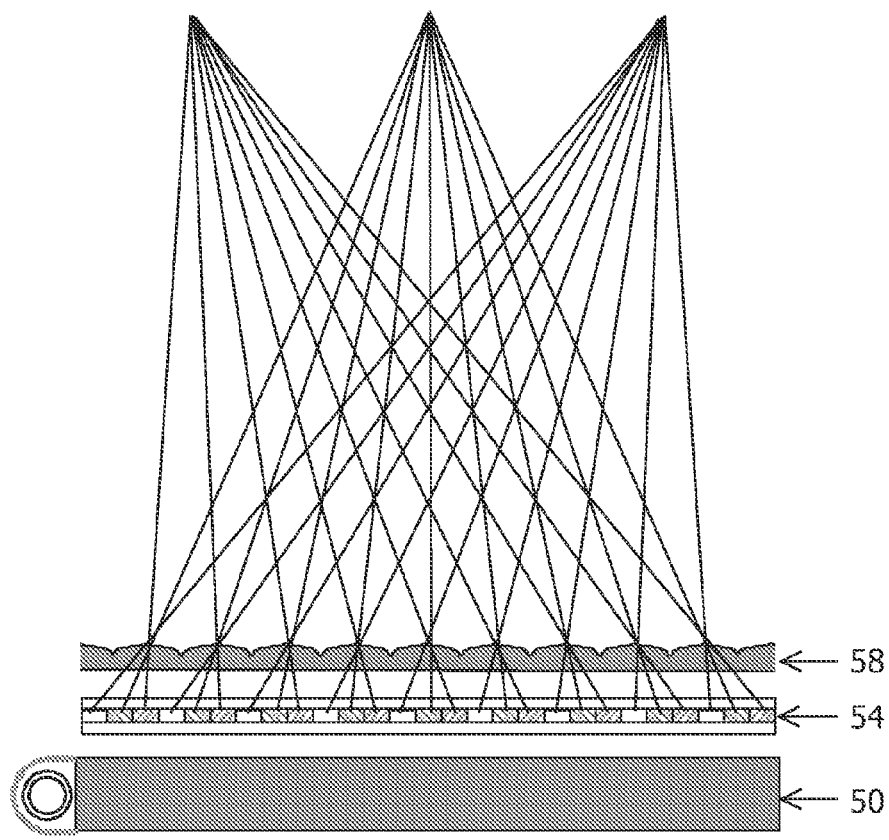
FIG. 4 shows how a lenticular array provides different views to different spatial locations.

FIG. 4 shows the principle of operation of a lenticular type imaging arrangement as described above and shows the backlight 50, display device 54 such as an LCD and the lenticular array 58. FIG. 4 shows how the lenticular arrangement 58 directs different pixel outputs to different spatial locations.

The invention is based on the use of a blue phase liquid crystal material in the switchable lens structure.

The existence of the so-called blue phase of a liquid crystal material has been recognized for many decades. However, this phase was associated with a very narrow temperature range. The blue phase is caused by defects that occur at regular distances in three spatial dimensions form a cubic lattice. Blue phases are thus formed by a regular three-dimensional lattice of defects within a chiral liquid crystal. Since the spacing between the defects of a blue phase are in the range of the wavelength of light (several hundred nanometers), for certain wavelength ranges of the light reflected from the lattice constructive interference occurs (Bragg reflection) and the blue phase reflects colored light (note that only some of the blue phases actually reflect blue light). The blue phase arises when the chiral LC material is warmed from the cholesteric phase or cooled from the isotropic phase.

In 2005, researchers from the Centre of Molecular Materials for Photonics and Electronics at the University of Cambridge reported their discovery of a class of blue-phase liquid crystals that remain stable over a range of temperatures as wide as 16-60 Celsius, as published in Nature, 436, pages 997-1000. It has been shown that these ultrastable blue phases could be used to switch the color of the reflected light by applying an electric field to the material, and that this could eventually be used to produce three-color (red, green, and blue) pixels for full-color displays. The new blue phases are made from molecules in which two stiff, rod-like segments are linked by a flexible chain.

A prototype Blue Phase LCD panel has been produced and publicized. The Blue Phase mode does not require LC alignment layers, unlike conventional TFT LCD technologies such as Twisted Nematic (TN), In-Plane Switching (IPS) or Vertical Alignment (VA). The Blue Phase mode can make its own alignment layers, eliminating the need for any mechanical alignment and rubbing processes. This reduces the number of required manufacturing steps, resulting in savings on production costs.

In a blue phase based LC-display for TV applications it is not the selective reflection of light according to the lattice pitch (as a result of Bragg reflection) that is used for display of visual information, but an external electric field induces a birefringence in the LC via the Kerr effect. That field induced birefringence becomes apparent as a change of transmission when the Blue Phase Mode LC layer is placed between crossed polarizers.

The advantages outlined above can obtained by applying a blue phase LC material to a switchable lens array, in that the need for polarization alignment layers is avoided, as well as the need for LC rubbing. The structure and manufacturing process is therefore simplified.

Figure 5:
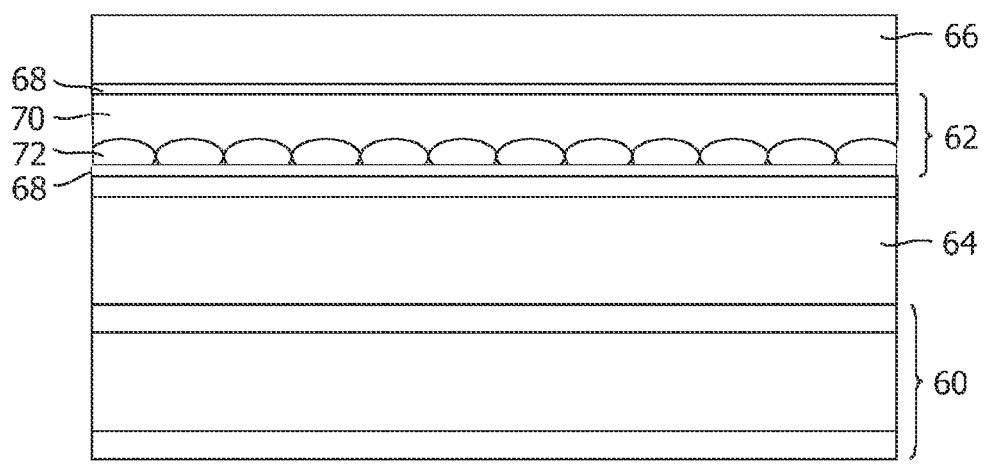
FIG. 5 shows an example of autostereoscopic display device of the invention.

FIG. 5 shows a first example of autostereoscopic display device of the invention.

The device comprises a conventional LC panel 60 (with polarizers) on top of which is provided the switchable lenticular array 62. A transparent spacer 64 is provided between the LC panel and the lenticular array, and a transparent cover 66 is provided over the lenticular array.

The lenticular array comprises opposing transparent electrodes (such as ITO) 68, a lens replica 70 formed of non-switchable material with a constant refractive index, and the blue phase LC material 72.

The 2D or 3D mode can be associated with the birefringent (anisotropic) blue phase, by choosing the replica to have one of the three possible refraction indices, i.e. $n_o$ (the ordinary ray refractive index perpendicular to the axis of anisotropy), $n_e$ (the extraordinary ray refractive index parallel to the axis of anisotropy), $n_{bf}$ (the isotropic blue phase refractive index), and by choosing a certain light polarization and choosing negative or positive air focal distance of the replica material.

The blue phase LC material is defined by the $n_o$ and $n_e$ values. When there is no electric field the material has an isotropic refraction index determined by:

$$n_{iso} = \sqrt{\frac{n_e^2 + 2n_o^2}{3}}$$

To have a good angle-stable 2D mode, an isotropic replica material with a refraction index equal to this isotropic value should be chosen (i.e. $n_{i(replica)} = n_{e(replica)} = n_{o(replica)} = n_{iso}$).

At this point, it is noted that any blue phase material having a stable blue phase over a temperature range of several degrees, preferably several tens of degrees, may be used. Non-limiting examples of such blue phase materials can for instance be found in WO 2005/075603 and WO 2007/147516, as well as in the aforementioned Nature publication. Such blue phase materials typically comprise a mixture of one or more (bi)mesogenic nematic compounds and a chiral additive such as a chiral nematic compound. As for instance is demonstrated in WO 2007/147516, the refractive index value of the blue phase material can be tuned by varying the composition of the mixture. Several examples of blue phase materials are given with values of $n_e$ ranging from 1.5545-1.6683 and an optical anisotropy $\Delta n = n_e - n_o$ ranging from 0.0708-0.1637. This demonstrates that the skilled person is capable of varying the composition of the blue phase material to vary its respective refractive indices as a matter of routine skill.

It is furthermore a matter of routine skill to approximately match the appropriate refractive index ($n_{iso}$, $n_o$ or $n_e$) of a blue phase material with the refractive index of the replica material. Many transparent polymers, e.g. (functionalized) polycarbonates (n=1.58), polyimides, fluorinated polyimides (n=1.52-1.54) such as the OPI series polyimides from the Hitachi company, fluorocarbons (n=1.36), mixtures of such polymers, as for instance disclosed in U.S. Pat. No. 6,989,190 and so on are readily available to the skilled person.

By way of example, the blue phase LC mixture C-2 disclosed in WO 2007/147516 (which is incorporated herein by reference) has an isotropic refractive index of 1.5094. A transparent material with matched refractive index is readily available for the replica structure. One example is structured glass with a refractive index of 1.500. Polymer materials are also available with even closer match to the desired refractive index of 1.5094. Furthermore, some polymers can be mixed to achieve an averaged effective refractive index, and this can be used to enable the desired refractive index to be obtained.

Preferably, the refractive index match is such that difference between the isotropic refractive index and the replica structure refractive index (i.e. the error in the match) is smaller than 5% of the refractive index difference of the LC material. For the C-2 example, the refractive index difference is 0.0930 and the matching is thus desired to be closer than 0.0047. More preferably, the error in the match is less than 2% or less than 1% of the LC refractive index difference.

However, in practice it can sometimes be difficult to exactly match the replica refractive index ($n_{i(replica)}$) with the value of $n_{iso}$, $n_o$ or $n_e$ as desired. Tuning of the refraction index of the LC with a smaller electrical field can then be provided to enable a small amount of anisotropy, thereby allowing the visible refractive index to increase until an exact match with $n_{i(replica)}$ is visible.

For the 3D mode, a lens effect is provided by generating a difference in refractive index between the replica and the visible refractive index of the blue phase LC material. Preferably, the refractive index difference should be as large as possible, so that the lens structure is as shallow as possible. and thus the least amount of LC material is required.

Low depth lenses can be achieved using in-plane switching. The axis of the anisotropic mode of the LC material in this case can be aligned parallel to the polarization of the light, so that $n_e$ then is visible. By choosing the replica to have a refractive index equal to $n_{iso}$ the resulting refractive index difference is formed by $\Delta n_{i(replica)} - n_e$. The refractive index difference and the required focus determine directly the required shape of the lens. In case of a single sided cylindrical lens the radius of such a lens would be chosen as $$r = \frac{f \cdot \Delta n}{n_o}$$

As the profile depth of a lens increases when the radius becomes shorter, a larger $\Delta n$ is means lower depth. As $n_{i(replica)} - n_e$ is bigger then $n_{i(replica)} - n_o$ this is the preferred embodiment when $n_r = n_{iso}$.

The optical anisotropy or refractive index difference can be even increased to $n_e - n_o$ by using double in-plane switching. Electric fields are set so that the optical axis of the anisotropic mode can be turned in plane parallel and perpendicular to the polarization of the light. This would be achieved for example with two sets of perpendicular structured ITO patterns each generating a perpendicular electric field. However in this embodiment the isotropic phase of the blue phase would not be exploited.

Many other variations are possible. For example, the LC and lens replica stacks can be arranged with the replica as the blue phase material and the lens elements as an isotropic material. The focal length of the lens elements can be positive instead of negative.

Figure 6:
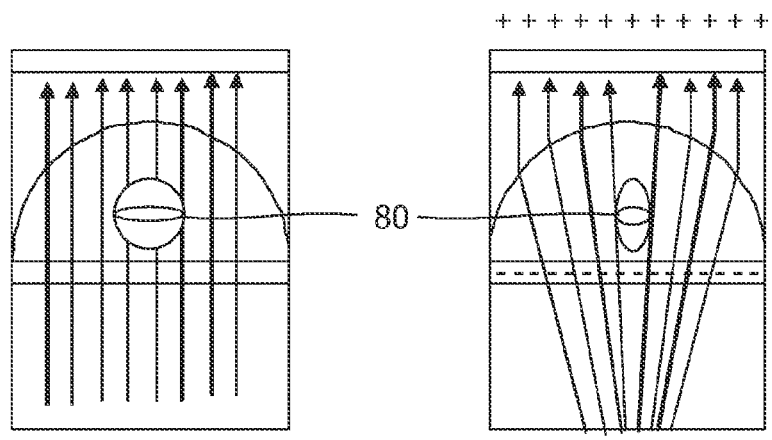
FIG. 6 is used to explain one possible polarization arrangement.

FIG. 6 shows an arrangement in which vertically polarized light rays are used, and shows a replica refractive index matched to the isotropic refractive index of the blue phase material ($n_{iso}$). The refractive index ellipsoid 80 is shown This is a known way of illustrating the visible refractive index in a birefringent medium. An ellipsoid illustrates birefringence and a sphere represents isotropic refractive index. The refractive index difference is formed by a $n_{i(replica)} - n_o$.

In the example above, the blue phase material is part of the lens structure. However, an alternative approach uses a passive lens arrangement in combination with a switchable polarization modifying arrangement. The passive lens arrangement has birefringent lenses and non-birefringent lens replica portions (or these can be arranged with the lenses non-birefringent and the replica portions birefringent). The replica portions have a refractive index matched to one of the refractive indices of the birefringent lenses, for example the extraordinary refractive index. The switchable polarization modifying device enables selection between a polarization state in which there is an index change between the lens and replica, and a state in which there is no change. Thus, the direction of polarization of the light entering the passive lens dictates whether the lens function is implemented or if the lens operates as a pass through device.

This system is described in detail in WO 03/015424.

The switchable polarization modifying device of such an arrangement can comprise the blue phase LC material, in accordance with the invention. The birefringence of the birefringent mode of the blue phase LC material, in combination with the blue phase LC material thickness, then give rise to the desired polarization modification. For example, the birefringent cell can function as a half wave plate, resulting in an orthogonal polarization change between the input and output of the cell when in the birefringent mode, and no change in polarization when in the isotropic mode of the blue phase LC material.

Thus, it will be clear that there are various examples of switchable 2D/3D autostereoscopic display device that can take advantage of blue phase LC materials to provide the switching function, and the invention is not limited to the main example described in detail above.

Figure 7:
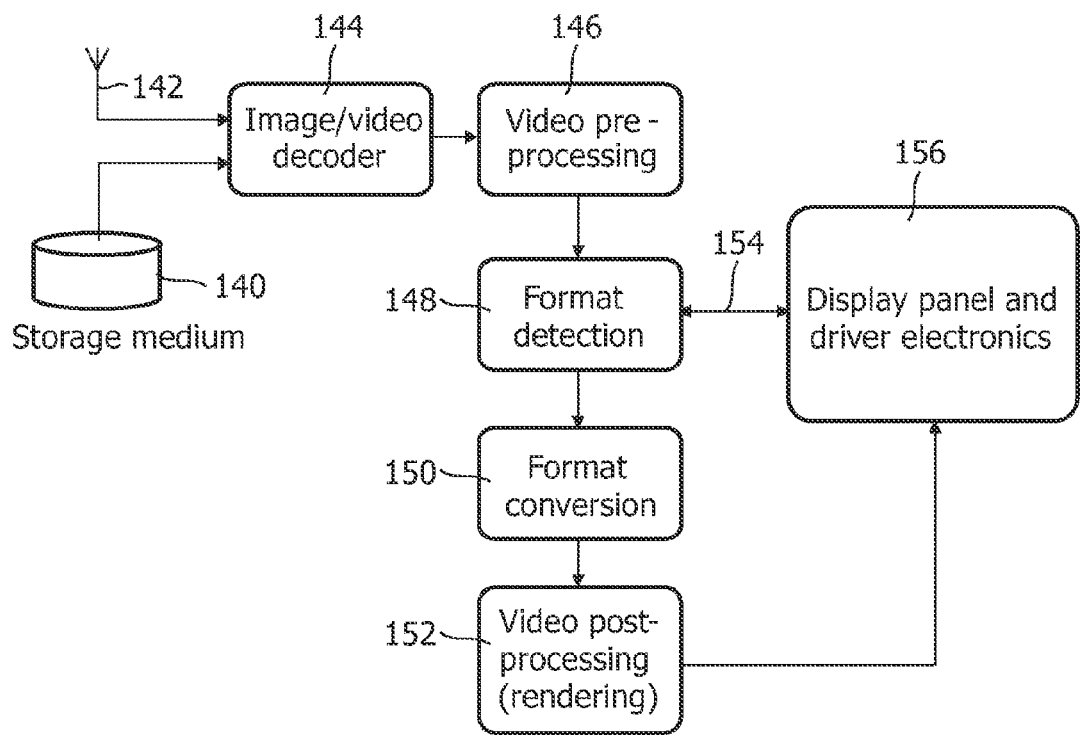
FIG. 7 shows an example of adaptive display system of the invention.

The switchable arrangement can be used as part of an adaptive 3D display, as shown in FIG. 7.

Image data is received from a storage medium 140 or live from an antenna 142 and is processed by an image/video decoder 144. Conventional video processing takes place in block 146.

The format detection unit 148 allows the 3D format of the received image to be detected (such as the number of views) and enables the display format to be detected, such as the orientation.

Based on the detected image format and the display capabilities, data format conversion may be required in block 150, and the image data is then prepared for display in an image rendering unit 152. However, in addition, the 3D imaging arrangement can be controlled as shown by arrow 154, so that the control of the display panel involves control of the lens array configuration as well as the control of the data provided to the display panel. These are controlled together to provide the desired 3D effect.

The examples above have discussed the 3D display modes as general image formats. It is also possible to switch different regions of the display to 2D and 3D modes. This of course requires segmented electrodes for driving the switchable lens arrangement.

The examples described above employs a liquid crystal display panel having, for example, a display pixel pitch in the range 50 μm to 1000 μm. However, it will be apparent to those skilled in the art that alternative types of display panel may be employed, such as organic light emitting diode (OLED) or cathode ray tube (CRT) display devices.

The manufacture and materials used to fabricate the display device have not been described in detail, as these will be conventional and well known to those skilled in the art.

The preferred example of controllable lens array has segmented row and column electrodes, but only segmented column electrodes are required to enable compatibility with multiple different views.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A switchable autostereoscopic display device having 2D and 3D modes of operation, comprising:
a display panel (60) having an array of display pixels (5) for producing a display, the display pixels being arranged in rows and columns; and
a lens arrangement (72) comprising a lens element arrangement (72) and a replica structure (70), one of which is formed of a blue phase LC material and the other of which is formed of a non-switchable isotropic material, the lens arrangement being for directing the output from different pixels to different spatial positions to enable an autostereoscopic image to be viewed,
wherein the device further comprises a controller adapted to switch the blue phase material to an isotropic state for the 2D mode and to a birefringent state for the 3D mode, and wherein in the 2D mode, the refractive index of the blue phase material matches the refractive index of the non-switchable isotropic material.

2. A display device as claimed in claim 1, wherein the imaging arrangement has no alignment layers.

3. A switchable autostereoscopic display device having 2D and 3D modes of operation, comprising:
a display panel (60) having an array of display pixels (5) for producing a display, the display pixels being arranged in rows and columns; and
an imaging arrangement (62) for directing the output from different pixels to different spatial positions to enable an autostereoscopic image to be viewed,
wherein the imaging arrangement comprises a blue phase LC material,
and wherein the device further comprises a controller adapted to switch the blue phase material to an isotropic state for one of the 2D and 3D modes and to a birefringent state for the other of the 2D and 3D modes, wherein the imaging arrangement comprises a lens arrangement (62) and a switchable polarization modifying device, wherein the switchable polarization modifying device comprises the blue phase LC material.

4. A device as claimed in claim 1, wherein the blue phase material comprises a mixture of one or more (bi)mesogenic nematic compounds and a chiral additive.

5. A device as claimed in claim 1, wherein the display panel (60) comprises an array of individually addressable emissive, transmissive, refractive or diffractive display pixels.

6. A device as claimed in claim 1, wherein the display panel (60) is a liquid crystal display panel.

7. A device as claimed in claim 1, wherein the controller is adapted to control the mode of the imaging arrangement in dependence on the image data.

8. A method of providing an autostereoscopic display switchable between 2D and 3D modes of operation, comprising:
producing a display from a display panel (60) having an array of display pixels (5), the display pixels being arranged in rows and columns; and
directing the output from different pixels to different spatial positions to enable an autostereoscopic image to be viewed, using a lens arrangement (62) which comprises a lens element arrangement (72) and a replica structure (70), one of which is formed of a blue phase LC material and the other of which is formed of a non-switchable isotropic material; and
switching the blue phase material to an isotropic state for the 2D mode and to a birefringent state for the 3D mode, and wherein in the 2D mode, the refractive index of the blue phase material matches the refractive index of the non-switchable isotropic material.

9. A method as claimed in claim 8, wherein switching the blue phase material comprises switching one of a lens element arrangement (72) and a replica structure (70) of the imaging arrangement (62).

10. A method of providing an autostereoscopic display switchable between 2D and 3D modes of operation, comprising:
producing a display from a display panel (60) having an array of display pixels (5), the display pixels being arranged in rows and columns; and
directing the output from different pixels to different spatial positions to enable an autostereoscopic image to be viewed, using an the imaging arrangement which comprises a lens arrangement (62) and a switchable polarization modifying device, wherein the switchable polarization modifying device comprises a blue phase LC material; and switching the blue phase material to an isotropic state for one of the 2D and 3D modes and to a birefringent state for the other of the 2D and 3D modes.

* * * * *